No. 632,519. Patented Sept. 5, 1899.
E. ERMOLD.
BOTTLE LABELING MACHINE.
(Application filed Jan. 5, 1899.)
(No Model.) 8 Sheets—Sheet 1.

FIG. 1.

No. 632,519. Patented Sept. 5, 1899.
E. ERMOLD.
BOTTLE LABELING MACHINE.
(Application filed Jan. 5, 1899.)
(No Model.) 8 Sheets—Sheet 3.

FIG. 3.

No. 632,519. Patented Sept. 5, 1899.
E. ERMOLD.
BOTTLE LABELING MACHINE.
(Application filed Jan. 5, 1899.)
(No Model.) 8 Sheets—Sheet 5.

WITNESSES: INVENTOR
Edward Ermold
BY
ATTORNEYS.

No. 632,519. Patented Sept. 5, 1899.
E. ERMOLD.
BOTTLE LABELING MACHINE.
(Application filed Jan. 5, 1899.)
(No Model.) 8 Sheets—Sheet 6.

WITNESSES: INVENTOR
M. Henry Wurtzel Edward Ermold
George Geibel BY
ATTORNEYS.

No. 632,519. Patented Sept. 5, 1899.
E. ERMOLD.
BOTTLE LABELING MACHINE.
(Application filed Jan. 5, 1899.)
(No Model.) 8 Sheets—Sheet 7.

WITNESSES:

INVENTOR
Edward Ermold
BY
ATTORNEYS.

No. 632,519. Patented Sept. 5, 1899.
E. ERMOLD.
BOTTLE LABELING MACHINE.
(Application filed Jan. 5, 1899.)

(No Model.) 8 Sheets—Sheet 8.

WITNESSES: INVENTOR
Bruno von Britzingslöwen Edward Ermold
M. Henry Wurtzel BY
 Attorneys.

UNITED STATES PATENT OFFICE.

EDWARD ERMOLD, OF NEW YORK, N. Y.

BOTTLE-LABELING MACHINE.

SPECIFICATION forming part of Letters Patent No. 632,519, dated September 5, 1899.

Application filed January 5, 1899. Serial No. 701,177. (No model.)

*To all whom it may concern:*

Be it known that I, EDWARD ERMOLD, a citizen of the United States, residing in the city of New York, in the borough of Manhattan and State of New York, have invented certain new and useful Improvements in Bottle-Labeling Machines, of which the following is a specification.

My invention relates to certain improvements in bottle-labeling machines of that class provided with horizontally-reciprocating pickers which are supplied with paste on their faces so as to take up a label, said label being then placed over the bottle and applied thereto by pressure exerted by a downwardly-descending plunger and a stationary table in connection with yielding elastic wipers; and the invention consists of a machine for labeling bottles which comprises horizontally-reciprocating pickers that take up the paste and transfer it to the edges of the label, the label being then carried forward by the pickers and applied to the bottle by the joint action of a vertically-reciprocating plunger, oscillating and spring-actuated wipers, and a stationary receiving-table below the bottle.

The invention consists, further, in certain details of construction, in the mechanism for imparting the required reciprocating movement to the label-carrying pickers, and in the mechanism of the paste-supplying and label-feeding mechanisms, as will be fully described hereinafter and finally pointed out in the claims.

In the accompanying drawings, Figs. 3 and 4 are vertical longitudinal sections of the operative parts of the machine, drawn on a larger scale, Fig. 3 representing the pickers in their overmost position ready for taking up the paste and label, while Fig. 4 shows the pickers in position for applying the label to the bottle.

Similar letters of reference indicate corresponding parts.

Referring to the drawings, A A' represent the supporting-frame of my improved bottle-labeling machine. The lower part A carries the bearings for the driving-shaft S and the cam-shaft S', to which latter power is transmitted from the driving-shaft S by suitable gear-wheels, while the upper part A' of the frame carries the guide-rods $a$ $a$ for the horizontally-reciprocating picker-carriage B and the guide-sleeves for the vertically-reciprocating plunger.

The main parts of my improved bottle-labeling machine consist of the vertically-reciprocating plunger D, by which the bottle is moved in downward direction, so as to take up the pasted label, pickers P, which are supported in stationary position on a horizontally-reciprocating picker-carriage B, laterally-oscillating and spring-actuated wipers F below the plunger for applying the pasted label to the bottle, and a stationary table or bottle-rest G below said wipers on which the bottle is deposited after it has been moved by the plunger past the pickers and wipers. The parts referred to are located approximately in a vertical plane, one below the other, when the label is applied to the bottle. Back of the wipers is arranged a label-feeding mechanism or so-called "elevator" E, which has the general construction of the elevators in use in envelop-machines, while back of the elevator is located the paste-box C. The horizontally-reciprocating picker-carriage B is guided on the guide-rods $a$ $a$ and operated by suitable mechanism from the cam-shafts S'. The pickers are arranged parallel to each other at the front part of the picker-carriage in such a manner that during the forward motion of the picker-carriage they take up the paste from the paste-supply box and are then lowered, so as to take up the uppermost label from the label-elevator. As soon as the label is taken up the picker-carriage is raised again and the pickers are moved forward into line with the plunger and bottle-rest, the label being in inverted position below the bottle. The actuating mechanism of the vertically-reciprocating plunger, horizontally-reciprocating pickers, oscillating wipers, paste-box, and the label-elevator are so timed that as soon as the label is removed from the pickers by the downward motion of the plunger and transferred to the bottle the picker-carriage is moved in backward direction to the end of its rear stroke clear of the label-elevator and paste-box, while during the forward stroke the pickers take up a new supply of paste and a new label for the next bottle to be labeled.

Figure 8:
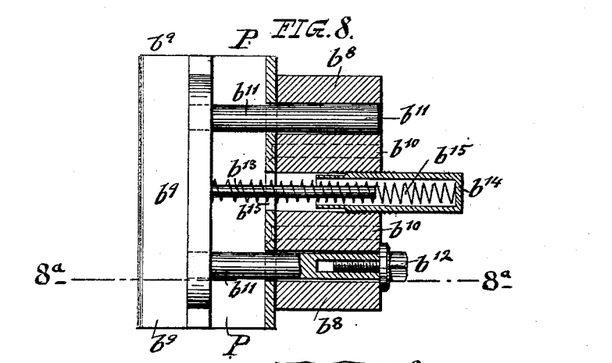
Figs. 8 and 8$^a$ are respectively a sectional plan view and a vertical longitudinal section on line 8$^a$ 8$^a$, Fig. 8, through one of the pickers.

*The picker mechanism.*—The picker mechanism is shown in detail in Figs. 8, 8$^a$, 9, and 10 and is composed of a picker-carriage B, which is provided at both sides with sleeves $b$, that slide on the stationary guide-rods $a\ a$. The sleeves $b\ b$ are connected at each side of the carriage B by vertical brackets $b^2$, which carry a transverse plate $b^3$ at their upper parts and by a transverse bar $b^4$ at their lower parts. On the plate $b^3$ is guided, by means of headed studs $b^5$, a transverse plate $b^6$, having slots $b^7$ for the studs $b^5$. The plate $b^6$ is provided at its lower part with forwardly-extending brackets $b^8$, the enlarged heads of which are provided with three transverse holes for the guide-shanks $b^{11}$ of laterally-movable and spring-actuated guard-plates $b^9$.

To the inner faces of the enlarged heads of the brackets $b^8$ are attached by fastening-screws $b^{10}$ the pickers P, so as to be stationary on the picker-carriage. The pickers P are step-shaped, their inner ends having horizontal faces that take up the paste for transference to the labels. The distance of the pickers from each other is equal to the width of the ordinary size of labels to be applied. When a different size, either larger or smaller than the normal size, is to be applied to bottles a special set of pickers, one for each size, has to be used in place of the ordinary pickers, so as to provide for the different sizes of bottles and labels used for the same.

Figures 9, 10:
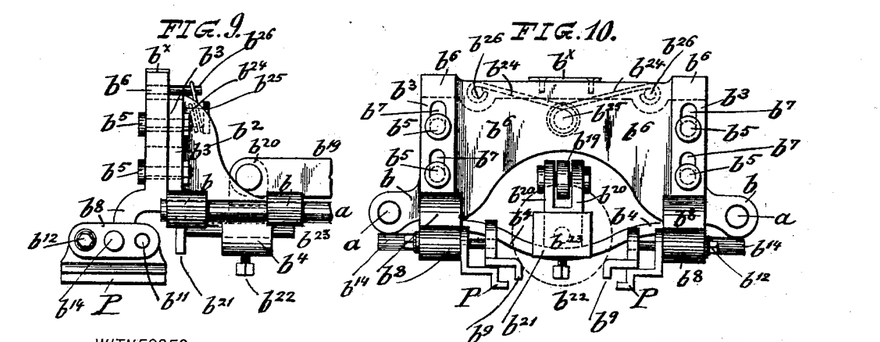
Figs. 9 and 10 are respectively a detail side elevation and a front view of the picker-carriage.

The guard-plates $b^9$ are arranged above the pickers P and project by their shouldered ends over the pickers, as shown in Figs. 8$^a$ and 10. Each guard-plate $b^9$ is provided with two shanks $b^{11}$, which are guided in the transverse holes of the bracket-heads, as shown in Fig. 8. One of the shanks $b^{11}$ is provided with a screw-socket at its end, which is engaged by an adjusting-screw $b^{12}$, by means of which the distance of the guard-plates from each other is regulated according to the size of the bottles to be labeled. Between the shanks $b^{11}$ each guard-plate $b^9$ carries a stem $b^{13}$, which extends into the third middle hole of the bracket-head $b^8$, into which is screwed a hollow socket $b^{14}$, that supports a strong helical spring $b^{15}$, which is interposed between the upper part of the guard-plate $b^9$ and the socket $b^{15}$, so that the guard-plates can yield in lateral direction when the bottle is forced through between the same. The guard-plates are so adjusted as to be closer together than the pickers, their distance from each other being smaller than the diameter of the bottle, while the distance between the pickers is somewhat greater than the diameter of the bottle, so that the latter can pass freely between the pickers after the guard-plates are forced apart by the downward pressure exerted on the bottle by the descending plunger.

When a quart-bottle is to be labeled, the guard-plates $b^9$ have to be set to a greater distance from each other than when a pint-bottle is to be labeled, in which case they are adjusted closer to each other. When the guard-plates are once adjusted for the proper size of bottles, they move readily over the stationary pickers in lateral direction, when the bottle to be labeled is forced through between them while it clears the faces of the pickers, so as to take up the label when moved by the plunger in downward direction.

The picker-carriage B receives a horizontally-reciprocating motion on the guide-rods $a\ a$ by a suitable cam $b^{16}$ on the cam-shaft S', a cam-groove on which engages an antifriction-roller on a lever $b^{17}$, that is pivoted at its upper end to an oscillating lever $b^{18}$, which is connected by a pivot-link $b^{19}$ with central ears $b^{20}$ on the cross-bar $b^4$. In front of the ears $b^{20}$ is arranged a gage-plate $b^{21}$, the sleeve $b^{23}$ of which is adjusted in a socket-hole below the ears $b^{20}$ and firmly held by a set-screw $b^{22}$, said gage-plate serving as a rest for the bottom of the bottle when the same is placed below the plunger. The gage-plate $b^{21}$ is set in forward or backward direction, according to the smaller or larger size of the bottles to be labeled, the gage when once set producing the exact position of the label on every bottle.

During the backward motion of the picker-carriage the pickers pass clear over the label-elevator and paste-box; but during the forward motion of the pickers they receive a downward motion against the tension of a wire spring $b^{24}$, which is applied at its middle portion to a central pin $b^{25}$ on the transverse plate $b^3$ and at its ends to pins $b^{26}$ on the transverse plate $b^6$ by means of a fulcrumed heel $b^{27}$, that acts on a heel-plate $b^\times$ at the upper end of the transverse plate $b^6$ and moves it with the pickers in downward direction when the same arrive over the uppermost label in the label-elevator E. This picker-operating heel $b^{27}$ is operated by a pivot-rod $b^{28}$, which is connected at its lower end with an oscillating and spring-pressed lever $b^{29}$, that is actuated by a cam $b^{30}$ on the end of the cam-shaft S'. The downward motion of the heel $b^{27}$ is so timed that it engages the heel-plate of the vertically-guided plate $b^6$ during the forward stroke of the picker-carriage when it arrives over the label-elevator and lowers the plate $b^6$ sufficiently so that the pickers can take up the uppermost label of the label-elevator.

Figure 11:
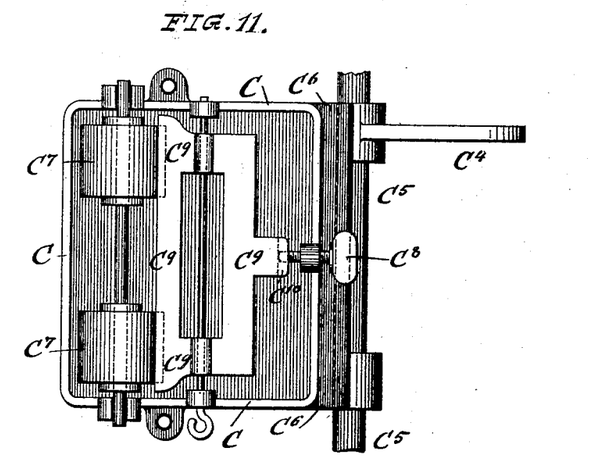
Figs. 11 and 12 are respectively a detail plan view and a side elevation of the paste-box.
Figure 12:
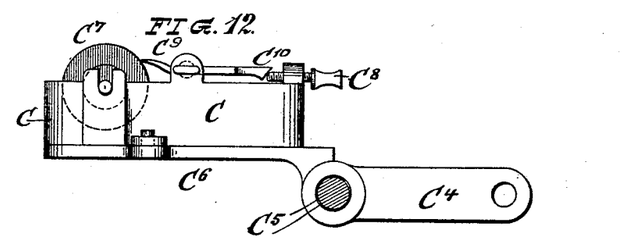

*The paste-box.*—During the backward motion of the picker-carriage the paste-box C is lowered, so that the pickers can pass clear of the paste-supplying rollers of the same. During the forward motion of the picker-carriage B, however, the faces of the pickers are placed in contact with the paste-supplying rollers of the paste-box C, which has been raised for this purpose. The oscillating motion imparted to the paste-box C is produced by a cam C' on the cam-shaft S', which cam operates an oscillating lever $C^2$, to which the connecting-rod $C^3$ is applied, which is pivoted at its upper end to a crank-arm $C^4$, which turns loosely on a stationary shaft $C^5$, supported by the frame A. To the crank $C^4$ is applied a platform $C^6$, to which the paste-box C is attached by suitable screws, as shown in Figs. 11 and 12. The paste-box C is supplied with paste from time to time and is provided at one end with paste-supply rollers $C^7$ and a doctor-blade $C^9$, which is fulcrumed to the paste-box and adjusted to the paste-supplying rollers by means of a set-screw $C^8$, which passes through the rear wall of the paste-box and engages an inclined rear lug $C^{10}$ of the doctor $C^9$, as shown in Figs. 11 and 12.

Figure 1:
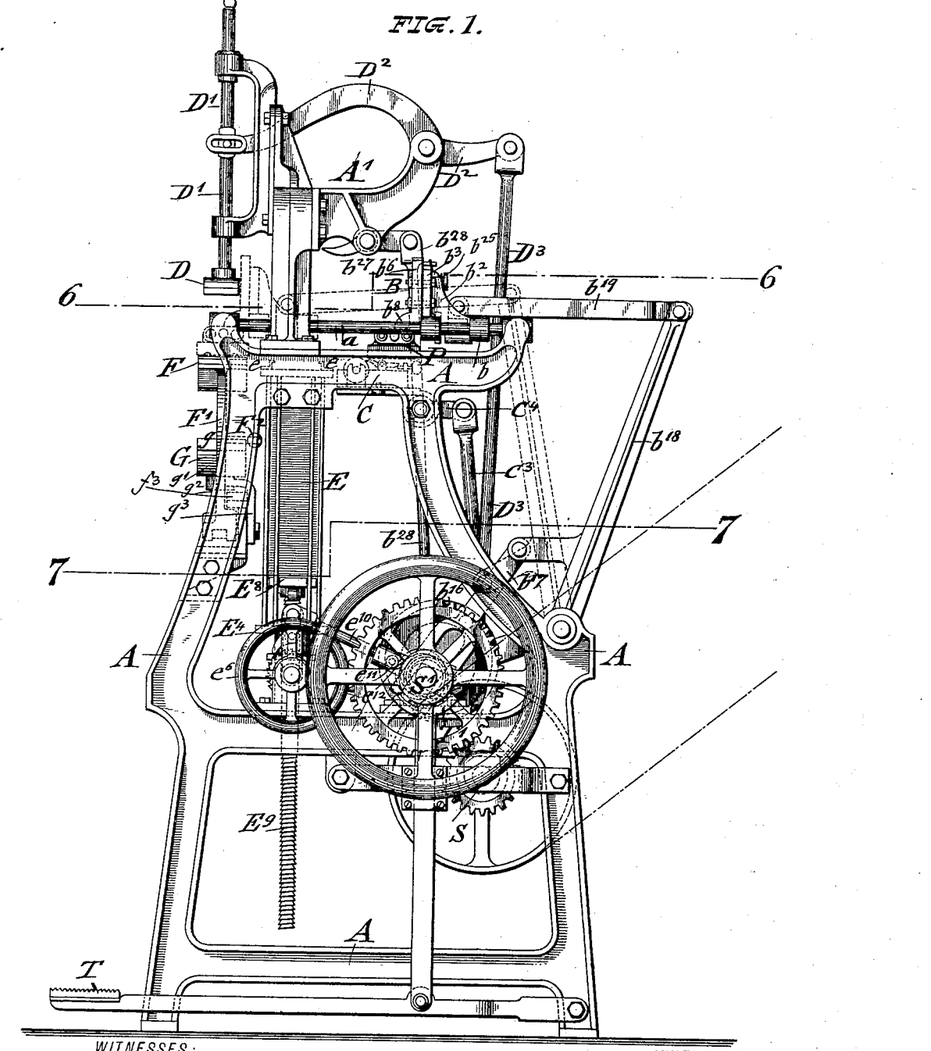
Figure 1 represents a side elevation of my improved machine for labeling bottles.
Figure 2:
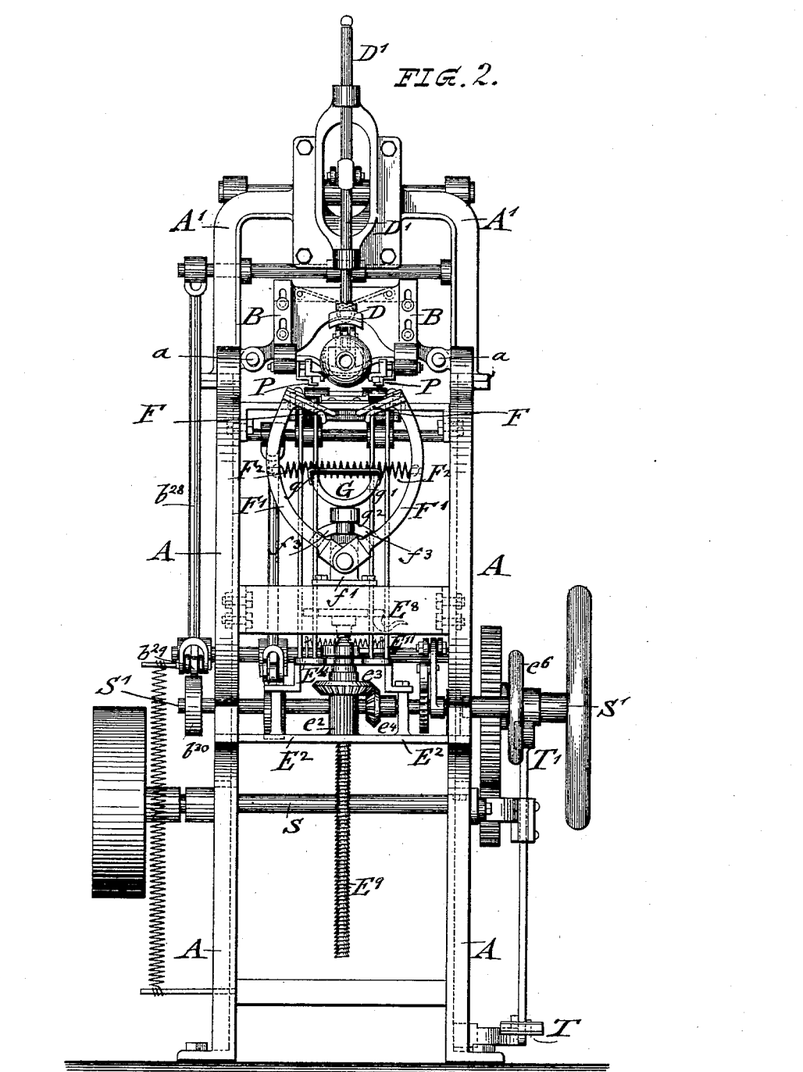
Fig. 2 is a front elevation of the same.
Figure 6:
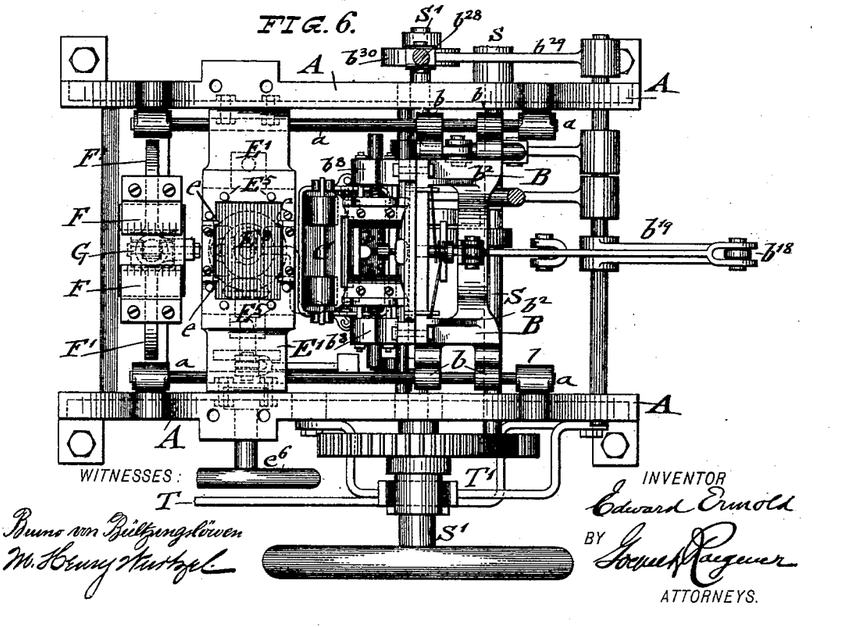
Figs. 6 and 7 are horizontal sections, respectively, on lines 6 6 and 7 7, Fig. 1.
Figure 7:
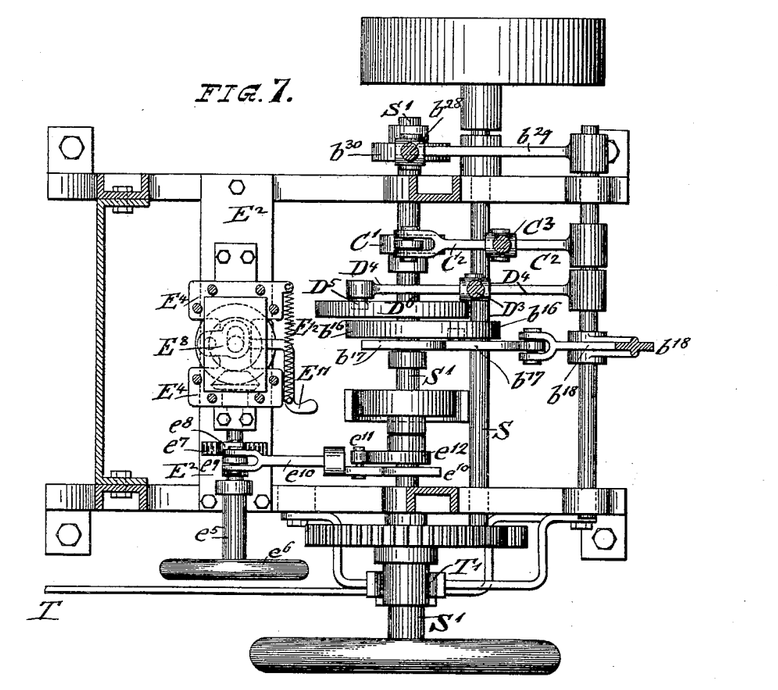
Figure 13:
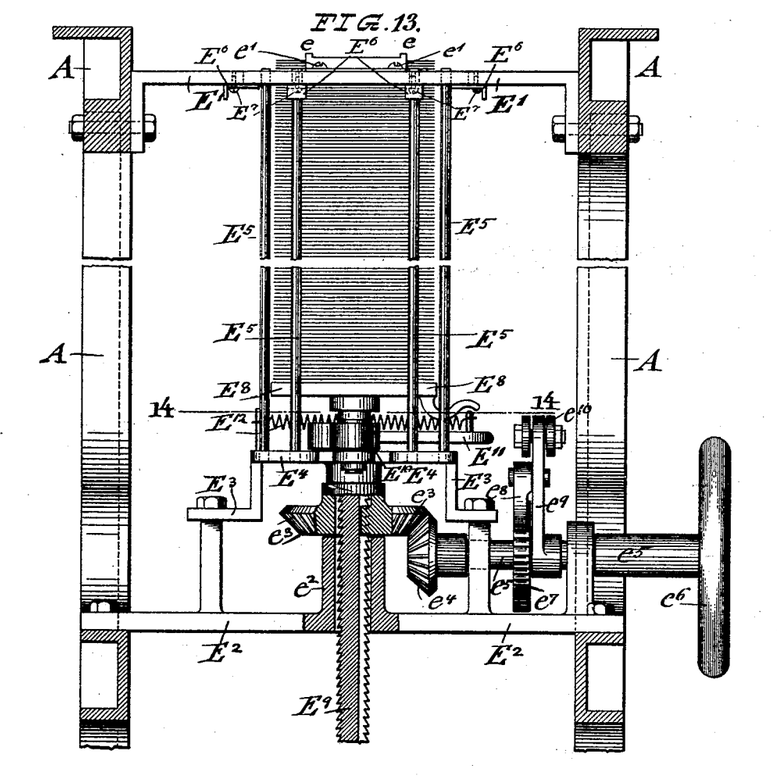
Figs. 13, 14, and 15 are respectively a detail sectional side elevation, a horizontal section on line 14 14, Fig. 13, of the label-feeding mechanism, and a detail top view of a portion of the label-guide box.
Figure 14:
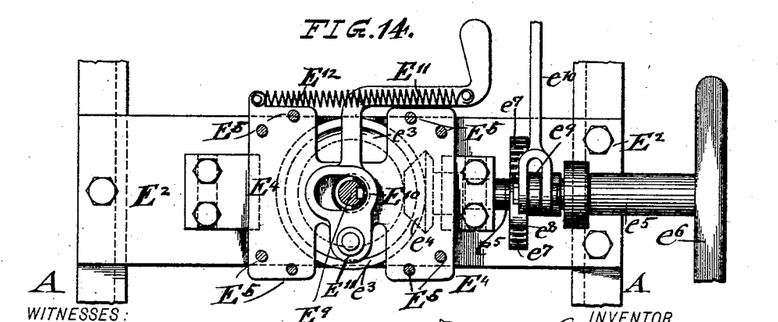
Figure 15:
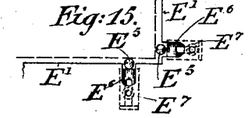

*The label-elevator.*—After the pickers have passed over the paste-supplying rollers and are supplied at their faces with paste they are moved forward until they are over the label-elevator E, after which they are depressed by the heel, so as to take up the uppermost label in the elevator. The label-elevator E is clearly shown in Figs. 1 and 6 and in detail in Figs. 13, 14, and 15. It is supported by an upper transverse bridge E' and a lower transverse bridge $E^2$, which are attached to the side standards of the supporting-frame A, the upper bridge being provided with an opening of sufficient size for permitting the free passage of the labels through the same. On the lower bridge $E^2$ is supported on suitable brackets $E^3$ a stationary platform $E^4$, which forms the lower part of the elevator. The platform $E^4$ and the upper bridge E' support eight guide-rods $E^5$, which form an open guide-box for the labels, the lower ends of said rods being firmly attached to the platform $E^4$, while the upper ends of the front and side guide-rods are adjusted in slots of the upper bridge E'. The adjustment of the upper ends of the guide-rods $E^5$ is made by means of slotted lugs $E^6$ and set-screws $E^7$, as shown in detail in Fig. 15, so that the upper ends can be adjusted closely to the labels to be supplied. The rear guide-rods are not required to be adjusted at their upper ends. To the front and rear of the opening in the upper bridge E' are applied two pairs of separating-fingers $e$, which are attached to the bridge E' by means of fastening-screws $e'$, said fingers projecting over the label in such a manner as to retain the same against the pressure of the feed mechanism acting on the lower end of the pile of labels, but permitting the easy removal of one label after the other by the pickers during the downward motion of the same when they arrive above the label-elevator. The separating-fingers $e$ project slightly over the labels and permit only one label at a time to be taken up by the pickers, they retaining the remaining labels in position. As the pickers descend their paste-covered faces engage the ends of the label when vertically over the label-elevator. During the upward motion of the pickers the uppermost label is lifted by the pickers and carried past the separators, as the paper of the label gives sufficiently for this purpose. When the label is thus picked up, the forward motion of the pickers is continued. The actuating-cam of the picker-carriage is so shaped that during the vertically-reciprocating motion imparted to the pickers a dwell in the forward motion of the picker-carriage takes place. If this were not the case, the picking up of the label could not be reliably performed. The labels, which are gradually fed by the elevator E, are supported in a pile on a vertically-movable follower $E^8$, which is swiveled to the upper end of a longitudinally-grooved screw-spindle $E^9$, that extends downwardly through the platform $E^4$ and a guide-sleeve $e^2$ of the lower bridge $E^2$. On the guide-sleeve $e^2$ rests the hub of a bevel-gear $e^3$, which is splined to the spindle $E^9$. The bevel-wheel $e^3$ meshes with a bevel-wheel $e^4$ on a horizontal shaft $e^5$, which turns in suitable bearings of the supporting-frame A and which is provided at its outer end with a hand-wheel $e^6$, by which the platform $E^8$ can be adjusted by hand when it should be necessary for setting the pile of labels for the separating-fingers $e$. On the shaft $e^5$ is placed a ratchet-wheel $e^7$, which is engaged by a pawl $e^8$, that is applied to a lever $e^9$, that is placed loosely on the shaft $e^5$ and the upper end of which is pivoted to a lever $e^{10}$, the forked rear end of which is guided along the cam-shaft S' and provided with an antifriction-roller $e^{11}$, that is acted upon by a cam $e^{12}$ on the cam-shaft S'. At each rotation of the cam-shaft S' the pawl-and-ratchet mechanism is operated and the ratchet-wheel moved for the distance of one tooth. The intermittent motion of the ratchet-wheel shaft $e^5$, which is transmitted to the screw-spindle of the follower $E^8$, is accomplished in connection with a screw-nut $E^{10}$, which forms part of a lever $E^{11}$, that is pivoted at one end to the lower platform $E^4$, while its opposite end is acted upon by a helical spring $E^{12}$, that is attached at one end of the lever $E^{11}$ and at its other end to a pin on the platform $E^4$, as shown in Fig. 14. When the laterally-movable screw-nut $E^{10}$ is drawn by the spring $E^{12}$ into mesh with the threads of the screw-spindle $E^9$, the axial motion imparted to the spindle by the transmitting mechanism is changed into a vertically-lifting motion, so that the spindle, the follower swiveled thereto, and the entire pile of labels supported on the follower are gradually lifted in such manner that at each rotation of the cam-shaft S' a label is supplied to the pickers. The follower E⁸ is provided with a suitable handle at its under side, by which it can be raised or lowered independently of the actuating mechanism described whenever it is necessary to refill the elevator with a new pile of labels. This is accomplished by taking hold of the lever E¹¹ of the screw-nut E¹⁰ with the right hand, while the left hand takes hold of the handle of the follower and then moving the screw-nut out of gear with the screw-spindle E⁹, so that the follower can be returned in downward direction into its lowermost position while the machine is at rest. The lever E¹¹ of the screw-nut E¹⁰ is then released, so that the screw-nut reëngages the threads of the screw-spindle. The labels are then inserted in small packages by hand between the rear guide-rods of the elevator and placed one on top of the other until the entire elevator is filled, the size of the elevator permitting the insertion of about four thousand labels, more or less, according to the thickness of the paper used for the labels. After the desired number of labels is introduced it is necessary to adjust the same to the separating-fingers so that the uppermost label forms contact with the same. This is accomplished by the hand-wheel $e^6$ at the end of the shaft $e^5$ until the uppermost label arrives at the fingers $e$ $e$. After the pile of labels is thus adjusted in the elevator the latter is in condition for supplying the labels to the pickers, and the machine is started again for work.

The general construction of the label-elevator is well known and has been practically employed for feeding the blanks in envelop-machines, the new feature being mainly in the arrangement of the movable screw-nut, by which the label-supporting platform can be returned with great facility into position for being resupplied with labels and by which the label-feeding operation can be interrupted at any time in case the elevator should not reliably and accurately supply the labels to the pickers.

*The plunger.*—The plunger D is arranged at the front of the machine and its shank D' guided in vertical keepers arranged at the upper part A' of the supporting-frame. Reciprocating motion is imparted to the plunger D by means of a fulcrumed lever D², the rear end of which is connected by a pivot-rod D³ with an oscillating lever D⁴, which is provided at the front end with an antifriction-roller D⁵, that is engaged by a groove on the cam D⁶ on the cam-shaft S'. The face of the plunger is made concave, so as to press on the bottle held below the same. The face of the plunger is covered with a layer of felt, rubber, or other suitable elastic material, so as to soften the impact of the plunger with the body of the bottle.

Figure 3:
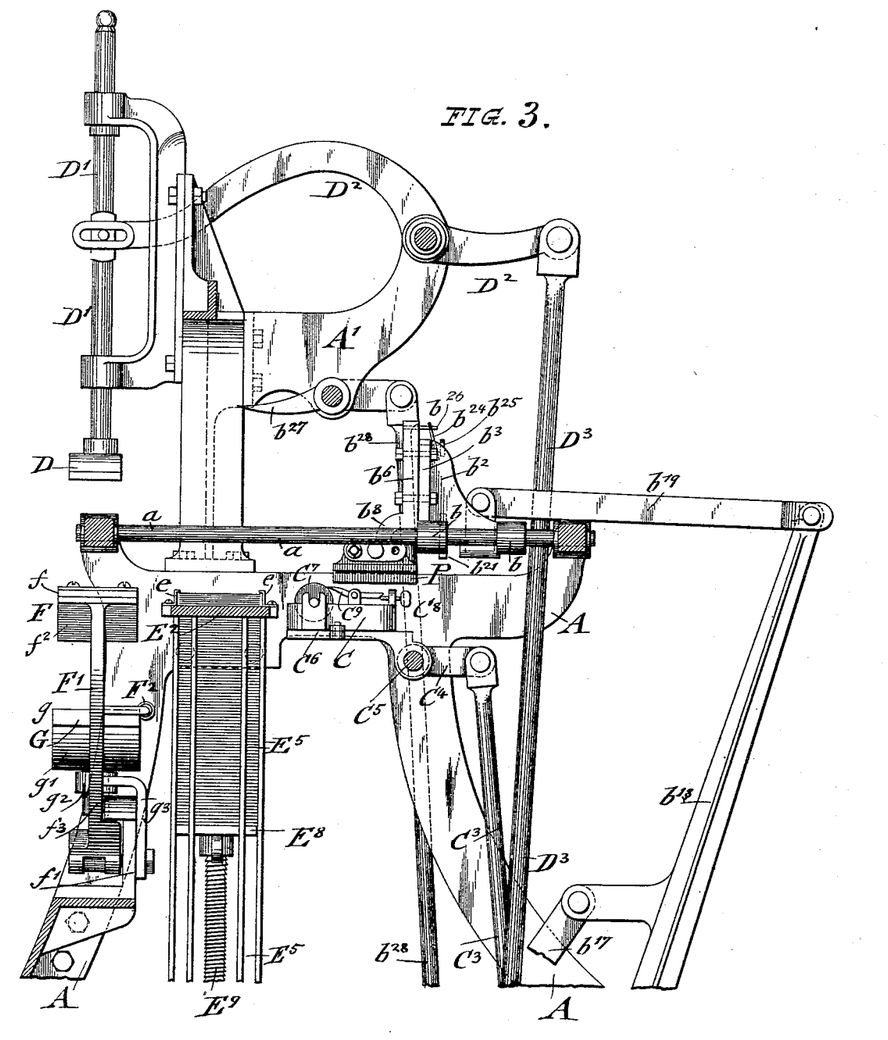
Figure 4:
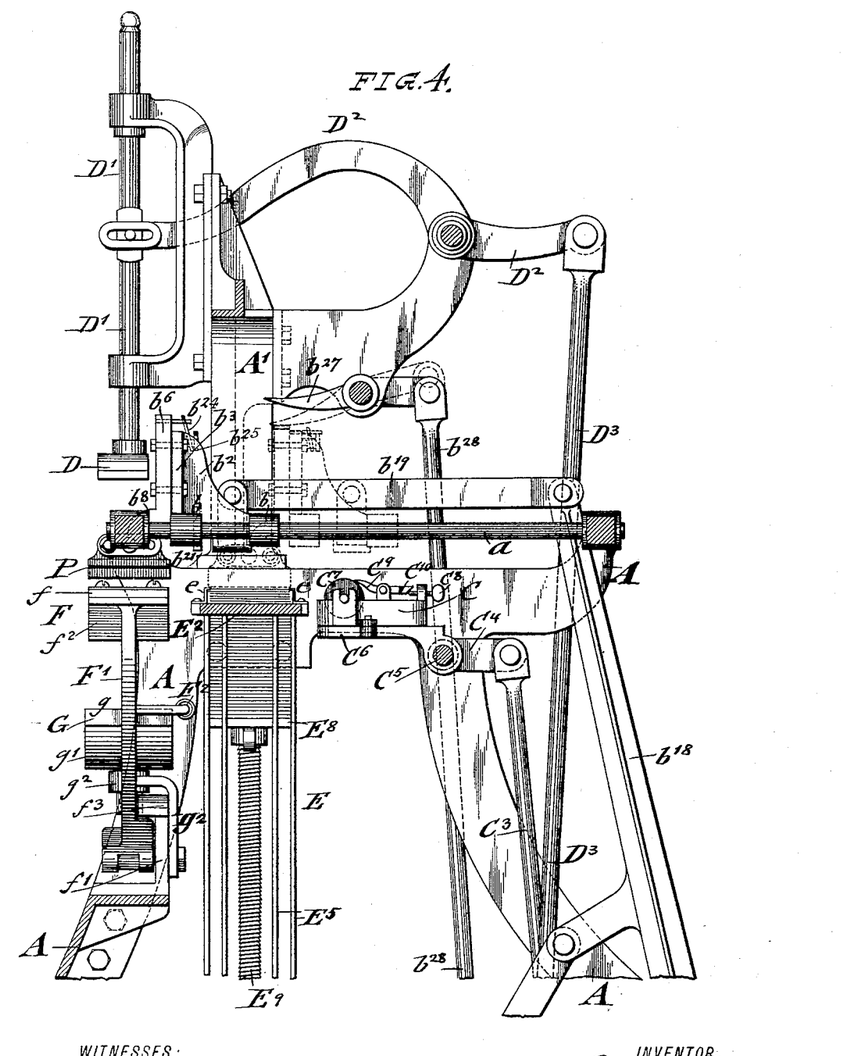
Figure 5:
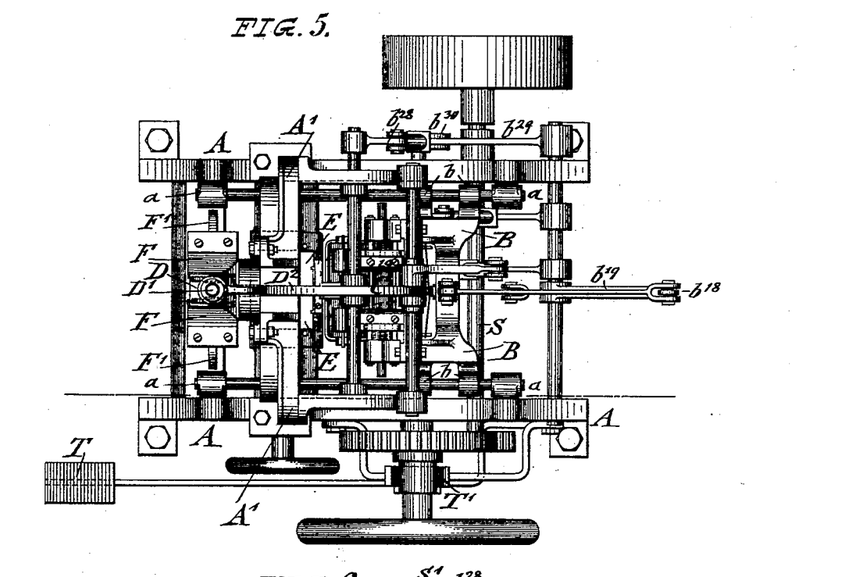
Fig. 5 is a plan view of the entire machine.

*The wipers.*—Below the plunger D and in the same vertical plane therewith are arranged two laterally-oscillating wipers F, which are supported at the upper ends of curved arms F', that are pivoted at their lower ends to a stationary lug $f'$ on the supporting-frame A. The wiper-arms F' are connected about midway by a helical spring F². The wipers F are composed of elastic plates $f$, made of rubber or other suitable material, which are preferably provided with short slits extending inwardly from their edges, so as to increase the flexibility of the edges, and of metallic plates $f^2$ below the same, the inner edges of which are curved downwardly, so as to permit the slitted edges of the elastic plates to bend down over the same. Below the wipers is arranged a stationary table or bottle-rest G, which is formed of an elastic band $g$, that is attached at the ends to a fork-shaped support $g'$, the shank of which is supported in a socket $g^2$ of a bracket $g^3$, which is attached to the supporting-frame A, as shown in Fig. 3. On the bracket $g^3$ are arranged stops $f^3$ for the arms F' of the wipers. The bottle-rest is located vertically below the plunger and serves to receive the bottle after the same has been forced by the plunger past the pickers and wipers.

Operation: A foot-treadle T is arranged at the lower part of the supporting-frame, which operates a clutch mechanism T', by which the cam-shaft S' is thrown into gear with the driving-shaft S, and thereby the machine started. During the forward motion of the picker-carriage the faces of the pickers are passed over the paste-supplying rollers, which are moved into contact with the same, after which the pickers on arriving above the label-elevator are lowered, so as to pick up by their paste-covered faces the ends of the uppermost label in the same. By the upward motion of the pickers the label is separated from the pile in the elevator, after which the forward motion of the picker-carriage is resumed until the pickers arrive below the plunger and practically in line therewith. The bottle is placed in position below the plunger so that its bottom abuts against the gage-plate of the picker-carriage. The plunger then descends and moves the bottle in downward direction through between the yielding guard-plates and the space between the pickers, so that the label is removed from the faces of the pickers and transferred to the bottle. By continuing the downward motion under the influence of the plunger the wipers are spread sidewise under the pressure of the bottle, so that they pass over the pasted edges of the label and apply them to the bottle by the hugging action of the wipers, said wipers imitating the action of the fingers of the hand in applying the label to the bottle. When the bottle has passed the wipers, it is taken up by the stationary bottle-rest below the same, the neck of the bottle being held during the downward motion by the attendant. It is removed from the bottle-rest and the next bottle placed below the plunger and against the gage-plate of the picker-carriage, the plunger and picker-carriage having in the meantime been returned to their normal positions. During the ascending motion of the plunger the picker-carriage is moved in backward direction, so that during its forward motion the pickers will receive a new supply of paste and take up a new label, so that when the pickers are returned into line with the plunger and bottle-rest the label will be applied to the next bottle, and so on.

I am aware that bottle-labeling machines of different constructions have been used heretofore; but they were objectionable on account of the unreliable working of their label-feeding mechanism, so that a large number of labels were spoiled in the operation of the machine, while the quantity of bottles that could be labeled within a given time was comparatively limited. In my improved machine the label-feeding mechanism works absolutely reliably, one label being supplied at each rotation of the cam-shaft, so that the labeling of the bottles can proceed without any interruption and at any speed at which the attendant desires to run the machine, the capacity of the machine with ordinary speed averaging about forty-eight bottles per minute. The machine is therefore especially adapted for the use of large bottling establishments, in which large numbers of bottles have to be labeled within a given time and which are now compelled to employ a large number of hands for pasting the labels on the bottles.

Having thus described my invention, I claim as new and desire to secure by Letters Patent—

1. In a bottle-labeling machine, the combination of a vertically-reciprocating plunger, a horizontally-reciprocating picker-carriage provided with pickers stationary on said picker-carriage and adapted to support the label while the plunger pushes the bottle against said label, and to remain stationary during said operation, laterally-yielding and spring-actuated guard-plates arranged above said stationary pickers, laterally-oscillating and spring-actuated wipers located below said plunger, and a bottle-rest below said wipers, substantially as set forth.

2. In a bottle-labeling machine, the combination of a vertically-reciprocating plunger, a horizontally-reciprocating picker-carriage provided with pickers stationary on the picker-carriage and adapted to support the label while the plunger pushes the bottle against said label, laterally-yielding and spring-actuated guard-plates arranged above said pickers and movable independently of the same, laterally-oscillating and spring-actuated wipers located below said plunger, and a bottle-rest below said wipers, substantially as set forth.

3. In a bottle-labeling machine, the combination of a vertically-reciprocating plunger, a horizontally-reciprocating picker-carriage provided with stationary pickers adapted to support the label while the plunger pushes the bottle against said label, laterally-yielding and spring-actuated guard-plates above said pickers and arranged closer to each other than the pickers, laterally-oscillating and spring-actuated wipers below said plunger, and a bottle-rest below said wipers, substantially as set forth.

4. In a bottle-labeling machine, the combination of a vertically-reciprocating plunger, a horizontally-reciprocating picker-carriage provided with stationary pickers adapted to support the label while the plunger pushes the bottle against the label, laterally-yielding and spring-actuated guard-plates above said pickers, a paste-box, means for oscillating the paste-box so as to move it in contact with the faces of the pickers during the forward motion of the same, a label-elevator located in front of the paste-box, means for operating said elevator so as to supply one label at each forward stroke of the pickers, oscillating wipers located in front of the label-elevator vertically below the plunger, and a stationary bottle-rest located below the pickers and plunger, substantially as set forth.

5. In a bottle-labeling machine, the combination of a supporting-frame having horizontal guide-rods, a horizontally-reciprocating picker-carriage sliding thereon and provided with stationary pickers adapted to support the label while the plunger pushes the bottle against the label, laterally-yielding and spring-actuated guard-plates above said pickers and movable independently of the same, a paste-box located below the pickers, and means for oscillating the paste-box so as to bring the paste-supplying rollers in contact with the faces of the pickers, substantially as set forth.

6. In a bottle-labeling machine, the combination of a supporting-frame having horizontal guide-rods, a horizontally-reciprocating picker-carriage provided with stationary pickers adapted to support the label while the plunger pushes the bottle against the label, an oscillating paste-box located at the rear part of the frame, and adapted to form contact with the pickers during their forward motion, a label-elevator arranged in front of the paste-box, means for feeding a label at each stroke of the pickers, and mechanism for reciprocating the pickers when arriving above the label-elevator so as to take up a label during each forward motion of the picker-carriage, substantially as set forth.

7. In a bottle-labeling machine, the combination of a horizontally-guided picker-carriage having a rear portion and a vertically-guided and spring-actuated front portion, stationary pickers supported at the lower end of said front portion, laterally-yielding guard-plates above said pickers, a paste-box, means for oscillating said paste-box so as to permit the pickers to form contact with the paste-supplying rollers of the same, a label-elevator in front of said paste-box, means for operating said elevator so as to supply one label to the pickers at each forward motion of the same, and means for vertically reciprocating the front portion of the picker-carriage so as to pick up a label from the elevator when the pickers arrive above the same, substantially as set forth.

8. In a bottle-labeling machine, the combination of a horizontally-reciprocating picker-carriage composed of a rear portion and a vertically-guided front portion, stationary pickers supported at the lower part of said front portion, spring-actuated and laterally-yielding guard-plates above said pickers, means for lowering the front portion of the picker-carriage when the pickers arrive above the label-elevator, and a spring applied to the front and rear portions for returning the front portion into normally-raised position after each depression, substantially as set forth.

9. In a bottle-labeling machine, the combination of a picker-carriage, composed of a rear portion and a vertically-guided and spring-actuated front portion, pickers at the lower end of said front portion, a cam-shaft, means for imparting reciprocating motion to said carriage, a label-elevator, mechanism operated from said cam-shaft for feeding a label at each rotation of the same, and mechanism for depressing the front portion of the picker-carriage when the same arrives above the label-elevator so that the pickers take up the uppermost label, substantially as set forth.

10. In a bottle-labeling machine, a label-elevator, consisting of label-guiding rods, a follower for the pile of labels in the same, and means for imparting to said follower movement toward the upper ends of the guide-rods, a bridge at the upper ends of said guide-rods, said bridge being provided with recesses for the guide-rods, and slotted lugs adjustable on said bridge against said guide-rods, substantially as set forth.

In testimony that I claim the foregoing as my invention I have signed my name in presence of two subscribing witnesses.

EDWARD ERMOLD.

Witnesses:
 PAUL GOEPEL,
 M. HENRY WURTZEL.